Figure 1:
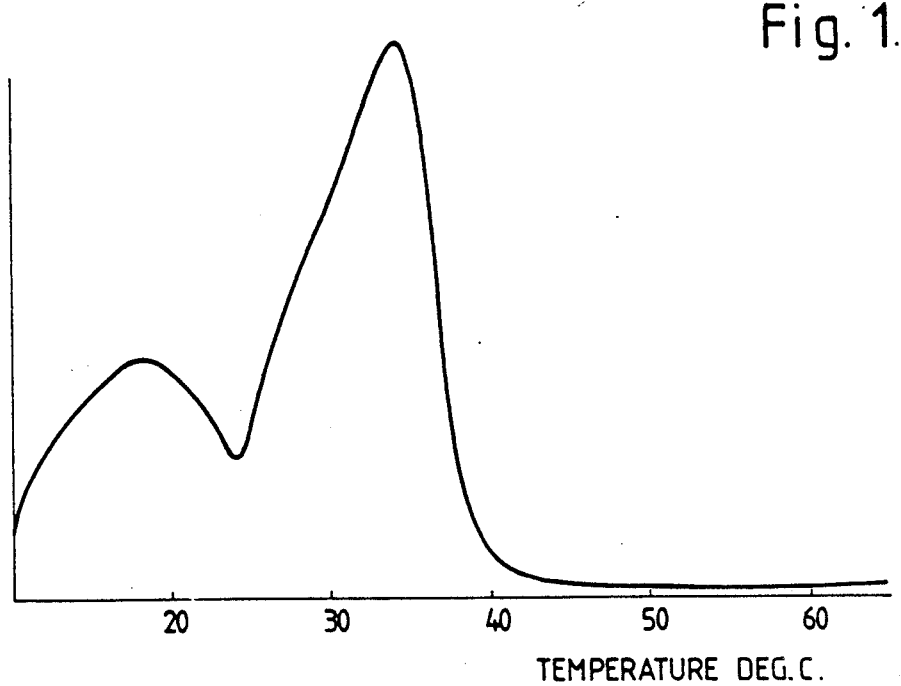

United States Patent [19]

Wesdorp et al.

[11] Patent Number: 4,954,362

[45] Date of Patent: Sep. 4, 1990

[54] PROCESS FOR PREPARING EDIBLE FAT PRODUCT

[75] Inventors: Leendert H. Wesdorp, Schiedam; Mattheus Struik, Vlaardingen, both of Netherlands

[73] Assignee: Lever Brothers Company, New York, N.Y.

[21] Appl. No.: 333,390

[22] Filed: Apr. 4, 1989

Related U.S. Application Data

[62] Division of Ser. No. 101701, Sep. 28, 1987.

[30] Foreign Application Priority Data

Sep. 26, 1986 [EP] European Pat. Off. ......... 86201673.0
Sep. 26, 1986 [EP] European Pat. Off. ......... 86201674.8

[51] Int. Cl.$^5$ ............................................. A23D 3/00
[52] U.S. Cl. ..................................... 426/602; 426/804
[58] Field of Search ........................ 426/601, 602, 804

[56] References Cited

U.S. PATENT DOCUMENTS 3,490,919  1/1970  Moran et al. ...................... 426/602
4,586,556  1/1986  McCoy ................................ 426/603

FOREIGN PATENT DOCUMENTS 529036   7/1981  Australia .
0101104  2/1984  European Pat. Off. .
0102656  3/1984  European Pat. Off. .
0130642  1/1985  European Pat. Off. .
1327511  8/1973  United Kingdom .

*Primary Examiner*—Donald E. Czaja
*Assistant Examiner*—Celine T. Callahan
*Attorney, Agent, or Firm*—Milton L. Honig

[57] ABSTRACT

The process disclosed by the invention is characterized in that a first fat or fat blend with an aqueous phase are emulsified, whereby an emulsion is obtained, the temperature of which is adjusted, if necessary to a value below 15° C., which cold W/O-emulsion, containing at least 1 wt. % of crystallized fat, is thereafter mixed with a second fat or fat blend having a slip melting point above that of the first fat or fat blend which second fat or fat blend is at such a temperature that the solids content thereof is not more than 25 wt. %.

11 Claims, 7 Drawing Sheets

PROCESS FOR PREPARING EDIBLE FAT PRODUCT

This is a divisional application of Ser. No. 101,701 filed 9/28/87.

TECHNICAL FIELD

The invention concerns a process for preparing an edible fat containing product comprising a fat-continuous phase and an aqueous phase, dispersed in said fat phase.

BACKGROUND OF THE INVENTION

Fat products of the above kind, such as low calorie spreads, wrapper and tub margarines have to comply with various requirements as regards taste, thermal stability, cycle stability, spreadability, melting behaviour and the like.

More in particular for fat products, such as those containing large amounts of polyunsaturated components, or having increased softness at refrigerator temperature, it can be difficult to comply with the requirements for cycle and thermal stability, as well as with those for cycle stability.

Stability against temperature changes (cycle-stability) is important in view of the possible temperature changes during transport and storage, but also in view of household use where frequent temperature changes can occur. Improved storage temperature cycle stability is therefore advantageous.

Heat stability, i.e. the absence of phase separation and of oil exudation at a certain temperature determines the ambient temperatures at which the product can be used. It is, of course, clear that, with respect to the heat stability, in tropical areas other temperature requirements are set than in for example the arctic region.

In general the heat stability is governed by the amount of hardstock, i.e. highmelting fats. A better heat stability, however, normally leads to a deterioration of the oral response, especially after temperature cycling. This is because the oral response largely depends on the melting behaviour of the fat phase.

Although Applicants do not wish to be bound by theory, it is believed that on the one hand the heat stability and on the other hand oral response and cycling stability do not well go together because the requirement of heat stability (e.g. heat stability at 30° C. for 24 hours) normally leads to the formulation of fat blends containing relatively high amounts of higher melting triglycerides, having a melting point above mouth temperature. These higher melting triglycerides are believed to be responsible for the deterioration of oral response and the reduced cycling stability.

In most conventional fat products, shortly after production, the higher melting triglycerides are crystallized in mixed crystals of a non-equilibrium composition, having incorporated therein considerable amounts of the lower melting triglycerides. In a well formulated blend the melting point of the mixed crystals is just below mouth temperature. In the mouth a fat product, containing such a blend, will melt entirely, whereby, since the water-in-oil emulsion is no longer stabilized, the aqueous phase together with the salt and flavour compounds present therein are released.

However, when conventional fat products are subjected to temperature cycling, the mixed crystals demix, and a separate, more pure fraction of the higher melting triglycerides crystallizes, partially in the form of shells, surrounding and stabilizing water droplets. In the mouth these water droplets remain stabilized by these high melting fat crystals, and consequently the flavour compounds dissolved therein will not be released. Conventional products displaying good heat stability always combine this property with a rather bad cycling stability and oral response. Vice versa, conventional products having improved cycle stability, due to the presence of a relatively small amount of high melting triglycerides, always suffer from a poor heat stability.

In this application, by fat is meant, unless indicated otherwise, an edible substance, which may be solid or liquid at ambient temperature, consisting essentially of triglycerides such as, for example, soybean oil, sunflower oil, palm oil, coconut oil, fish oil, lard and tallow, which may have been partially or completely hydrogenated or modified otherwise, or comprising non-toxic material having properties similar to triglycerides, which material may be indigestible, such as for example waxes, e.g. jojoba oil and hydrogenated jojoba oil, and poly fatty acid esters of mono- and disaccharides, e.g. sucrose octa fatty acid ester, or mixtures thereof. The terms fat and oil, moreover, are used interchangeably.

European Patent Application 130642 describes a method for making a fat spread on the basis of fractionated palm oil and/or palm stearin, which results in a spread having a double peaked differential scanning calorimetry curve. This method essentially comprises stepwise crystallization of the fat, resulting in a DSC-peak between 10° C. and 25° C. and a peak between -10° C. and 5° C.

It is an object of the present invention to provide an edible fat containing fat product comprising a improved process for preparing continuous fat phase, and an aqueous phase dispersed in said fat phase, which process provides a product that has an improved pattern of properties, especially as regards thermal stability, oral response and storage temperature cycle stability.

SUMMARY OF THE INVENTION

A process for preparing an edible fat product is provided that comprises the steps:

(a) emulsifying at least one first fat with a water phase to obtain an emulsion;

(b) adjusting said emulsion to a temperature below 15° C. thereby obtaining a cold water-in-oil emulsion containing at least 1 weight % of crystallized fat; and (c) mixing said cold water-in-oil emulsion with at least one of a second fat having a slip melting point above that of said first fat, said second fat being maintained at a temperature at which said second fat has a N-value of not more than 25.

The fat product according to the invention is characterized by at least one DSC-peak above 36° C., at least one other DSC-peak between 20° and 36° C., preferably between 20° and 35° C., which has a surface area at least equal to the peak above 36° C., and the presence of crystallized fat, having a melting point above 36° C., at least 20 wt. % of the crystallized fat being present in the form of fat globules, having a size between 1 and 20 micrometer. Preferably at least 50 wt. % of the crystallized fat is present in the form of fat globules having a size of more than 1 micrometer. Most preferred, however, are products wherein at least 40% of the crystallized fat is present in the form of fat globules having a size ranging from 1-12 micrometers. When using the word "size" with respect to the crystallized fat globules the maximum diameter of said globules is meant.

DESCRIPTION OF THE INVENTION

It has been found that the fat product according to the invention, such as for example water-in-oil or oil-in-water-in-oil emulsions, have greatly improved characteristics.

It has namely been found that by providing the present set of properties a product is obtained that has a better compromise between oral response, thermal and cycle stability, in comparison with conventional fat products having the same bulk composition.

Yet another advantage of the products according to the invention is that they may contain large amounts of oil (for example polyunsaturated) as the present products may display an increased hardness, when compared with similar conventional products.

Furthermore the melting behaviour of the products is better in comparison to the conventional fat products, i.e. they taste better if they have the same thermal stability.

A further important advantage is that these advantages are substantially retained after cycling. This is especially the case with products wherein the first DSCpeak below 36° C. is at least 3° C. below the the first DSCpeak above 36° C.

Finally it is remarked that products according to the invention may have a reduced hardness at 5° C. ($C_5$) with, at the same time, an equal or higher hardness at 20° C. ($C_{20}$) in comparison with conventional fat products based on the same components. This 'flatter' C/T-line is especially important for household spreads, where the cold spread, directly from the refrigerator, has to be spreadable, but where on the other hand the spread should not be too soft at room temperature.

Although the claimed products do not necessarily possess all of the above mentioned improved characteristics, they are all in one or more product aspects superior to similar conventional products.

In a preferred embodiment the fat product of the invention has an N40 below 10, more preferably it has an N35 below 10 and an N20 below 30, preferably between 8 and 25. The N-values are measured by using the NMR method as described in Journal of American Oil Chemists' Society, 51 (1974), 316 by Van Putte et al.

The invention is in general directed to edible fat products, having a fat content between 35 and 100 wt.%, preferably to spreads containing 38–90 wt.% fat in the form of W/O-emulsions.

Spreads having a fat content of 65–90% by weight, e.g. margarines are preferred according to one embodiment. The advantages offered by the present invention are especially appreciated in fat-products having a low $C_5$, e.g. very soft margarines, products containing relatively large amounts of unsaturated fatty acid residues and spreads for tropical areas.

Fat products having a high amount of unsaturated components are of course characterized by the presence of large amounts of oil, which lead to the problem that it is difficult to have sufficient thermal stability and hardness. In another embodiment the present invention provides a product displaying an improvement in the hardness, without the necessity of a decrease in the amount of unsaturated components, and without a deterioration of the oral response. The amount of unsaturated fatty acid residues in the present fat product is preferably between 30 and 80 % by weight of the fat phase, more preferably these ranges apply to the poly unsaturated fatty acid residues. In the case of fat products having a low $C_5$, for example between 300 and 700, it is possible to have a higher $C_{20}$ than with conventional products. The method for determining the C-values is described in Journal of American Oil Chemists' Society 36 (1959), p. 345. Both products described hereinabove preferably contain not less than 30 wt.% of oil that is liquid at 0° C.

Tropical spreads are usually characterized by an oral response that is not so good, especially when compared with normal table spreads. This is mainly due to the presence of the high melting components, that are necessary for the heat stability.

With the present invention it is possible to have a tropical spread having the required heat stability, and with improved taste, even after temperature cycling, as the high melting components, although present, are not or at least to a substantially less degree noted in the mouth, and also since the flavour release is substantially less hampered by the presence of these high melting crystals.

The considerations given hereinabove also apply for fat products having lower fat contents, such as low calory spreads with fat contents of between 35 and 65 wt.%.

According to yet another embodiment, the present invention is therefore directed to low calorie spreads having fat contents of 35–65 wt.%.

One of the aspects of the products according to the present invention is the DSC-peak substantially above 36° C., i.e. the DSC-peak of which the top is located above 36° C. Preferably at least 80% of the surface area of the peak, i.e. the surface between the base line and the line generated by the differential scanning calory meter, is above 36° C. It is thus possible that a part of the lower temperature tail of the peak is located below 36° C. When determining the surface area of individual peaks, in case peaks overlap, it is assumed that the peaks are symmetrical.

Furthermore, at least one peak should be present between 20° and 35° C., which peak(s) must have a (total) surface area (as defined hereinbefore) that is at least equal to the surface area of the peak above 36° C. In the fat products according to the present invention therefore two separately melting fractions are present.

Combination of this feature with the requirements on the presence of the higher melting crystallized fat globules gives the product of the invention, having the discussed advantages.

The DSC-temperature peaks of fat products can be determined in the conventional way using a differential scanning calorymeter. A short survey of this method with some literature references is given in the Ullmanns Encyklopädie der technischen Chemie, 4. Auflage, Band 5, pages 793–795. In this application all DSC-curves are DSC-melting-curves.

As set forth hereinabove, the fat products according to the present invention, when compared with conventional products, either combine an improved heat stability with a good cycling stability and good oral response, or vice versa combine an improved cycling stability and/or an improved oral response with a good thermal stability. It is noted that fat products according to the invention, having at least one DSC-peak above 36° C., have a structure comprising some kind of network of high melting fat crystals in the continuous fat phase, to which good heat resistance can be attributed. This "network" is, however, of such a nature, that it does not influence the taste of the product too much. It is quite surprising that although a separate high melting fat fraction is present, as evidenced by the DSC-peak, the fat product nevertheless behaves as a product stabilized by low melting crystal as far as taste is concerned.

Moreover, even if the products according to the present invention have relatively high N35 values, e.g. between 3 and 8, they appear to be quick melting and are described as thin and cool-melting.

It is noted that fat products can have further DSC-peaks at temperatures below the temperature of the two (or more) peaks mentioned hereinabove, corresponding to lower crystallizing triglycerides present in the fat.

The spreads of the invention can be prepared using conventional fats, such as palm oil, soybean oil, coconut oil, rapeseed oil, cottonseed oil, sunflower oil, fish oil, tallow fat, butterfat, and mixtures thereof. Preferably vegetable fats and/or animal fats such as tallow and/or lard are incorporated in the products according to the present invention. It is furthermore possible to modify the above fats by various known techniques, such as fractionation hardening, interesterification or combination of two or three thereof.

The product of the invention can sometimes be characterized by polarised light-microscopy. It has been noted that in some preferred embodiments the high melting fat is crystallized in a layer or 'peel' structure. These spheres of fat crystals are responsible for the 'Malthezer cross', which may be seen on examining such products by means of polarised light microscopy. The Maltezer cross is an indication of the presence of separately crystallized high melting fat crystals.

Light microscopy may also be used to reveal the small fat crystals which are present in the form of small globules. In the fat product according to the invention at least 20 wt. % of the crystallized fat having a melting point above 36° C. is present in the form of fat globules, having a size between 1 and 20 micrometer. The size and distribution of the fat globules may be determined by conventional light microscopy techniques.

In electron-microscopy the products of the present invention are characterized by a comparatively large number of 'more perfect' crystals, in comparison with conventional products of the same bulk composition, but without the inventive features. This indicates that less mixed crystals are present with the results as set forth hereinabove.

Yet another embodiment of the present invention is a process for preparing an edible fat product according to the present invention, having a fat content of 35–90 wt.%, by emulsifying part of the fat with the aqueous phase and mixing the obtained emulsion with an additional amount of fat.

In European patent application 0 101 104 a process for preparing an edible fat spread is described, wherein an artificial cream is prepared, and mixed with a separately processed fat phase, which was cooled to 0° C. The object of this so called split stream process is to decrease the amount of rework in case of packing machine break-down.

In British Patent Specification 1 327 511 a Process is described in which a liquid of a temperature of 40° C., which comprises 12% of an interesterified fat blend of 50 parts of hydrogenated palm kernel oil of a slip melting point of 39° C. and 50 parts of hydrogenated palm oil of a slip melting point of 58° C., is mixed with a second liquid of a temperature of 2° C., which second liquid consists of 72% of sunflower oil (liquid at 0° C.) and 16% water.

The process according to the invention is characterized in that a first fat or fat blend and an aqueous phase are emulsified, whereby an emulsion is obtained, the temperature of which is adjusted, if necessary to a value below 15° C., which cold W/O-emulsion, containing at least 1 wt.% of crystallized fat, is thereafter mixed with a second fat or fat blend having a slip melting point above that of the first fat or fat blend which second fat or fat blend is at such a temperature that the solids content thereof is between 2 and 30 wt.% Preferably the emulsion comprises from 2 to 20 wt. of crystallized fat before mixing.

The slip melting point of the first fat or fat blend is preferably below 35° C.

In the present process the high melting triglycerides, present in the second fat or fat blend, are mixed with the cold W/O emulsion, comprising crystallized low melting triglycerides, as a result of which separately crystallized fat crystals will be present in the final product. Although we do not wish to be bound by theory, it is believed that this separate crystallization is responsible for the beneficial effects obtained by the present process.

By separately preparing the cold W/O emulsion, an emulsion is obtained, wherein the surface of the water droplets is almost completely occupied with crystals of the low melting triglycerides. On mixing this emulsion with the second fat or fat blend, a final product is obtained in which the surface of the water droplets is still occupied with the low melting triglycerides. These products have a supreme oral response because the flavour release of the water droplets is not hindered by the presence of a shell of high melting triglycerides around the water droplets. The separately crystallized high melting triglycerides, however, are present in the form of a network, stabilizing the product, and preventing oil exudation at temperatures as high as 30° C.

The process according to the invention gives an edible fat spread displaying an improved combination of heat stability, oral response and/or cycling stability. Moreover the products obtained by the process have an increased hardness at 25° C. in comparison with a conventionally prepared spread having the same bulk composition. Yet another advantage of the process of the invention is that the products obtained therewith can have a relatively low $C_5$, and at the same time an increased $C_{20}$, as compared with conventional margarines.

According to preferred embodiments the slip melting points of the two fat phases differ by at least 5° C., more in particular 10° C. The magnitude of this difference influences the beneficial effects that may be derived from the process according to the present invention; the beneficial effect being more pronounced when the difference is larger.

According to a very preferred embodiment the slip melting point of the first fat or fat blend is below 30° C. and the slip melting point of the second fat or fat blend is above 40° C. In this case a very pronounced effect is noted, namely that a product is obtained combining a high thermal stability and with a very good stability against temperature cycling, presumably due to the presence of some kind of network of the second fat or fat blend. The presence of such a network however, does not influence the taste of the fat spread negatively.

In one specific area, namely the so-called tropical spreads the choice of fat to be used is very important, as for use in tropical areas the spread has to have a thermal stability at or above 30° C., whereas it also has to be cycle stable. Furthermore the oil exudation at 30° C. should be low. Usually preparation of tropical margarines is accomplished by using edible fats which have been hardened to such a degree that the thermal stability is sufficient.

With the process of the present invention these thermally stable margarines for use under warm conditions can be much improved with respect to the oral response. It has namely been found that this process leads to a product with a melting behaviour resembling a product stabilized by low melting fat crystals. The unexpected result of the process is thus that good taste and thermal stability up to 30° C. can be combined.

In the process according to the invention the first fat or fat blend is emulsified with the aqueous phase, and the temperature of the emulsion obtained, if necessary, is adjusted to below 15° C., more in particular to below 10° C. More preferably the temperature is adjusted to between 5° and 10° C. It is important to apply the correct temperature, as the second fat or fat blend has to crystallize due to the "cold-content" of the emulsion, as preferably no further cooling steps are provided for. It is also important that the cold emulsion already has its final character, i.e. phase-inversion should have taken place already, and also the water droplet distribution should be near to its final status. The emulsion is preferably prepared by treatment in two A-units followed by a C-unit, although it is possible to use other systems as well.

The emulsion usually contains one or more emulsifiers that favour W/O-emulsion, whereas also the fat- and water-soluble additives required for the final product are incorporated therein.

The second fat or fat blend comprises a partially molten fat, or a fat containing up to 30, preferably up to 25 wt.% of solids, more preferably not more than 10 wt.% solids (crystallized fat) at the temperature at which it is fed to the mixing unit for mixing with the cold emulsion, which temperature preferably is above 20° C. At the moment of mixing the second fat or fat blend with the W/O emulsion, said second fat or fat blend may be in an supercooled state, as a consequence of which retarded crystallization may occur.

The relative amounts of the two process streams can vary widely, depending on the type of fats and the amount of water present. A lower limit for the amount of W/O-emulsion is 17,5 wt.%, corresponding to 82,5 wt.% of second fat. The upper limit for the W/O-emulsion is 97 wt.%, corresponding to 3 wt.% of second fat. In general the contribution of the W/O-emulsion will not exceed 90 wt.%.

The conditions during the mixing of the two components of the spread can influence the product properties to a large degree. Short residence times and/or low shear favour the formation of a separate high melting crystal network. The shear rate should be low in order to prevent the substitution of low melting fat on the water droplet surface by high melting fat crystals, and also to not destroy the network of high melting fat crystals, which stabilizes the product.

Suitable mixers for this purpose are well-known. Examples thereof are static mixers and jet mixers. It also possible to use a cavity transfer mixer, as described in WO-A 8 303 222.

After the mixing step, the product is fed to a packing line, without further working or cooling, and the spread is packed. The packed spread is then stored during which storage the final properties are obtained.

Fats to be used in the two fat fractions of the present process are selected on the basis of their slip melting point. It is noted, however, that it is also possible to use fat blends containing fats that have as such a slip melting point outside the range specified for the blend, provided that the blend as a whole has the correct slip melting point.

A possible approach for obtaining the high and low melting fats is to fractionate an existing fat, for example a hardened soy bean oil, and use the high and low melting fractions separately. This is especially advantageous in countries where there are restrictions on the kind of raw materials to be used. Moreover in this way no by-products in the form of separate fat fractions are produced.

In the present process commonly used fat- and water-soluble additives may be incorporated, such as emulsifiers, milk, protein, preservatives, salt and flavours.

The invention is now further elucidated on the basis of the following examples.

EXAMPLES AND COMPARATIVE EXAMPLES

EXAMPLES 1 AND 2

A blend of 46 wt. parts soybean oil and 54 wt. parts hardened soybean oil (melting point 37° C.) was fractionated.

The resulting olein fraction (slip melting point 23° C.) was emulsified with water, in two subsequent A-units and one C-unit, yielding an emulsion with a temperature of 15° C.

Parallel therewith 0.9 kg/hr of the stearin fraction (slip melting point=50° C.) was worked in a A-unit followed by a C-unit, resulting in a fluid fat phase with a temperature of 27.5° C. and a solids content of 8 wt.%.

These two streams were subsequently mixed, using a static mixer (example 1) and a cavity transfer mixer (example 2). The margarine products (comprising about 18 wt.% of water) thus obtained were filled in tubs and after storage the properties were determined. The results are given in the table 1.

COMPARATIVE EXAMPLE A

The non-fractionated starting blend used in the example 2 was emulsified to yield 3.9 kg/hr W/O-emulsion in two A-units and a C-unit. The emulsion having a temperature of 17° C. was treated in a cavity transfer mixer in the same way as in example 2.

The obtained product was filled into tubs, and, after storage, the properties were determined (see table 1).

The salt release was determined by measuring the conductivity of a certain amount of water, at a certain temperature (i.c. 33° C.), after a specific amount of product had been mixed with the water under vigorous stirring. Where is has previously been determined how much salt was incorporated in the product, the percentage of salt released (contributing to the conductivity of the distilled water) can thereby be determined.

The salt release was also determined by means of a test panel, who were asked to indicate their impression of the salt release in a percentage between 0 and 100, where 0% indicates no salt-release, and 100% indicates that all the salt present is released.

TABLE 1

| Example | | A | 1 | 2 |
|---|---|---|---|---|
| Salt release (at 33° C.) | | | | |
| - non cycled | (n.c.) | 45% | 70% | 52% |
| - cycled | (c.) | 44% | 71% | 45% |
| Salt impressing | n.c. | 70% | 78% | 75% |
| (expert panel) | c. | 52% | 75% | 60% |
| C 5 | n.c. | 1750 | 1200 | 1150 |
|  | c. | 1650 | 1100 | 1800 |
| C 15 | n.c. | 900 | 800 | 850 |
|  | c. | 700 | 550 | 900 |
| C 25 | n.c. | 110 | 70 | 210 |
|  | c. | 100 | 100 | 170 |

COMPARATIVE EXAMPLES B AND C, EXAMPLE 3 a blend as used in Example 1, having a temperature of 40° C. was processed through 2 A-units and a C-unit, followed by packing at 15° C. to yield a 80 wt.% fat-containing spread. The results are given in Table 2 as Example B. The DSC curve of the spread is presented in FIG. 1.

Example 2 was repeated, with the exception that the first fat blend and the second fat blend had the same composition, namely as used in Example 1. The emulsion of 12° C. and the liquid fat (32° C.) were mixed as in Example 2 and packed. The results are given in Table 2 as Example C.

Figure 2:
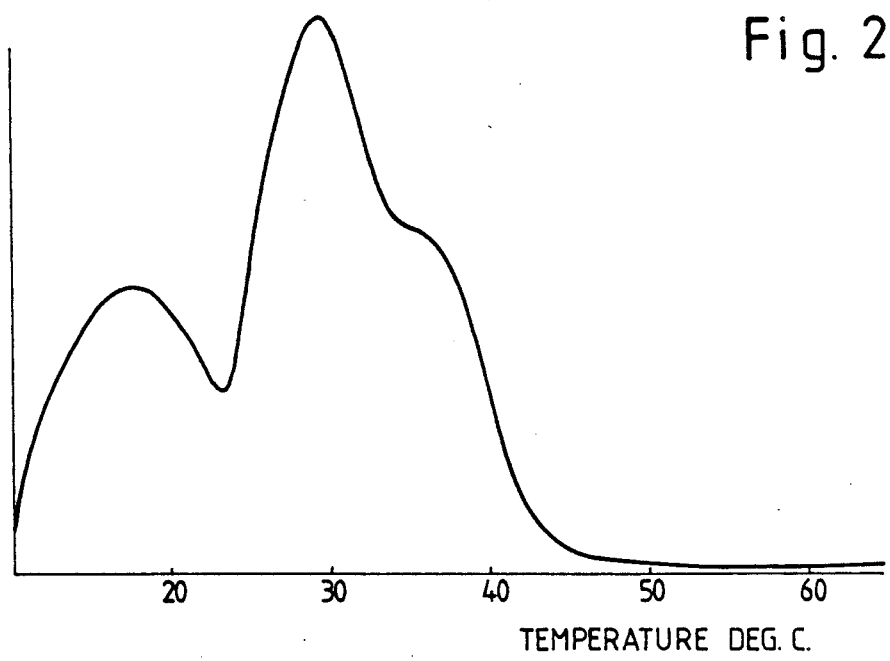

Example C was repeated, with the exception that the blend was first fractionated (at 25° C). The olein fraction was used for the emulsion and the stearin fraction was used as the second fat blend. Before mixing the emulsion had a temperature of 12° C., and the stearin fraction a temperature of 32° C. The results are given in Table 2 as Example 3. The DSC curve is presented in FIG. 2.

The stability of the product was determined by measuring the amount of oil exudated, at 30° C., by 50 ml of product.

TABLE 2

|  | B | C | 3 |
|---|---|---|---|
| $C_5$ | 1400 | 1400 | 1200 |
| $C_{25}$ | 70 | 65 | 110 |
| $C_5$ (cycl.) | 1400 | 1400 | 1250 |
| $C_{25}$ (cycl.) | 65 | 80 | 150 |
| stability (30° C.) | | | |
| non cycled | +/− | +/− | ++ |
| cycled | − | − | ++ |
| salt impression | 72 | 70 | 81 |
| (expert panel) | | | |
| cycl. | 75 | 70 | 74 |

+/− 1-3 mm oil after 24 hrs.
+ 1 mm oil after 24 hrs.
++ no oil

EXAMPLE 4 AND COMPARATIVE EXAMPLE D

Figure 3:
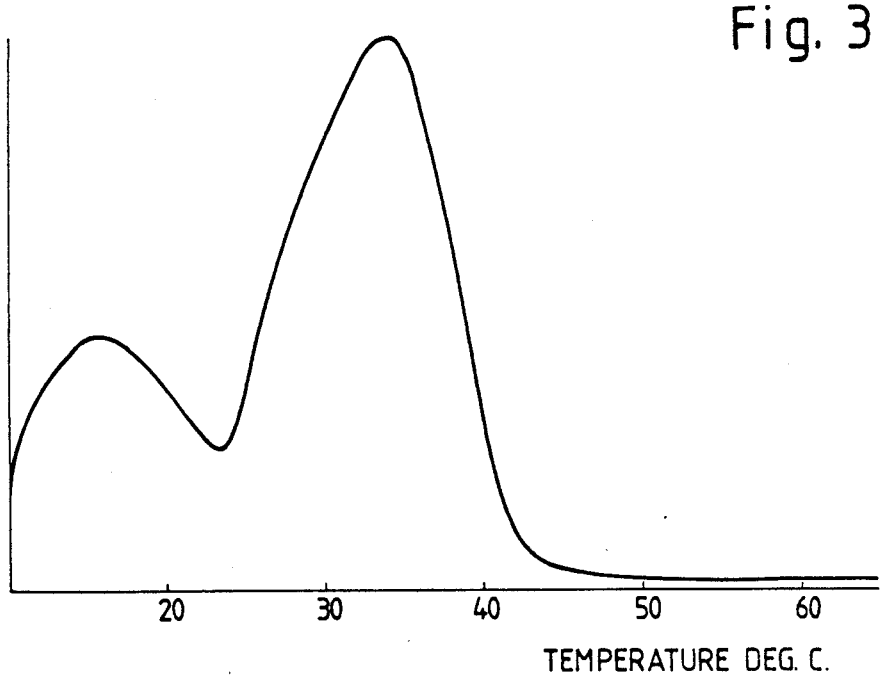

A fat blend (having an $N_{35}$ of 2) consisting of 60 wt.% sunflower oil and 40 wt.% hardened (39° C.) soybean oil was processed as described in Example B. The results are given in Table 3, as Example D. The DSC curve of this product is given in FIG. 3.

Figure 4:
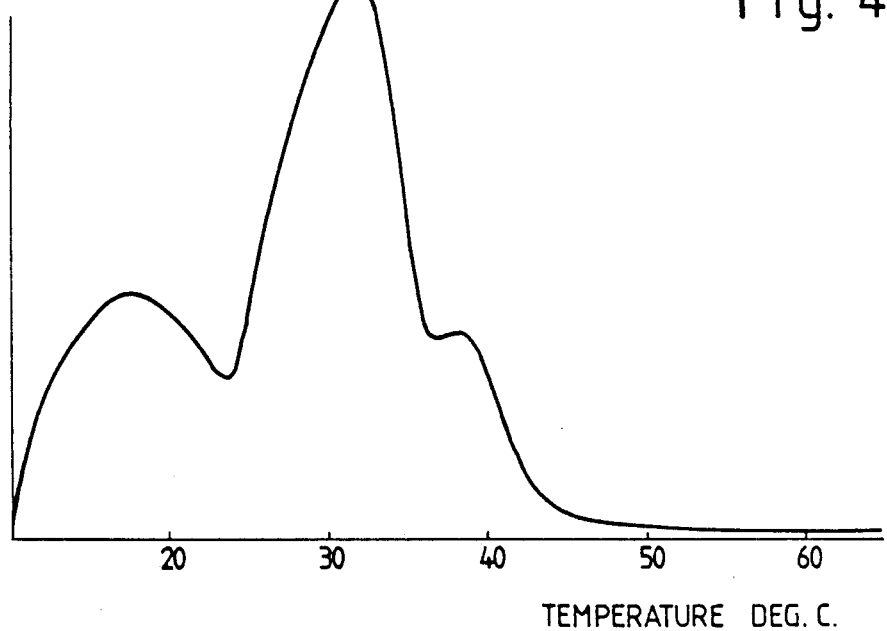
Figure 5:
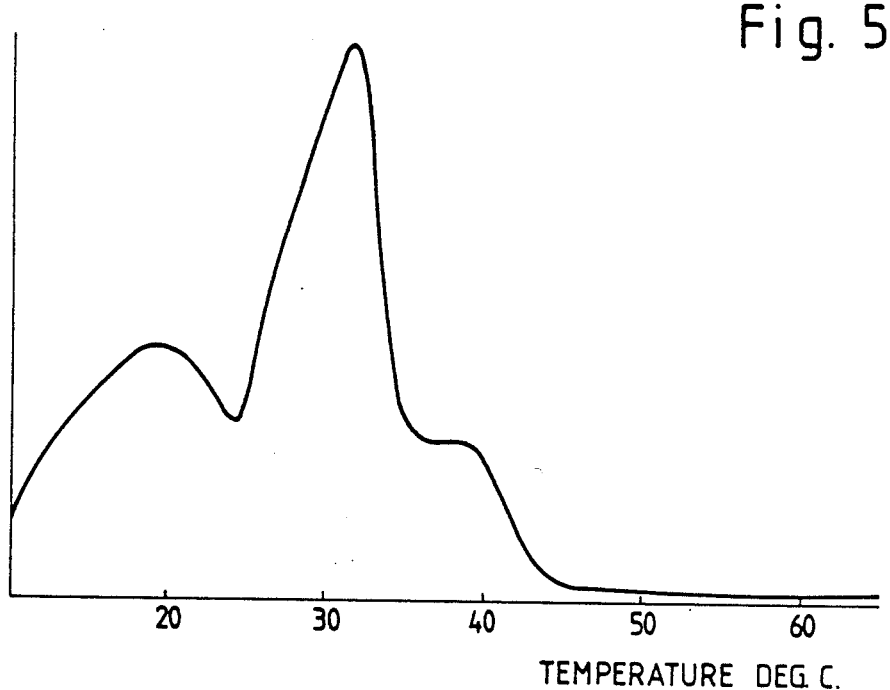

The same fat blend was first fractionated (30° C.), and the olein fraction was processed through two A-units and a C-unit, yielding a W/O-emulsion having a temperature of 10° C. The stearin fraction was processed through an A-unit and a C-unit resulting in a product with a temperature of 30° C. The two product streams were mixed in 1) a static mixer, and 2) a cavity transfer mixer. When determining the properties of the packed product, no significant differences could be observed. These properties are given in Table 3, as Example 4. The DSC curves are presented in FIG. 4 (CTM) and FIG. 5 (static mixer).

TABLE 3

| Example | D | 4 |
|---|---|---|
| $C_5$ | 780 | 460 |
| $C_{25}$ | 60 | 70 |
| $C_5$ (cycl.) | 720 | 550 |
| $C_{25}$ (cycl.) | 90 | 90 |
| stab. (30°)* | + | ++ |
| cycled | + | ++ |
| salt impression | 74% | 74% |
| (expert panel) | | |
| cycl. | 51% | 72% |
| salt (Release) 33° C. % | 42% | 95% |
| cycl. | 45% | 80% |

*See TABLE 2

EXAMPLE 5 AND COMPARATIVE EXAMPLE E

A fat blend of 11 parts soybean oil, 39 parts slightly hardened soybean oil (melting point of 28° C.), and 30 parts of dry fractionated butterfat olein (melting point 24° C.) is processed together with the waterphase, using an AAC-sequence, i.e. the blend is subsequently passed through two A-units and a C-unit.

The above fat blend after having passed the AAC-sequence had a temperature of 7.5° C., and a solids content of 3.5%. The blend was mixed, by means of a cavity transfer mixer, with 20 parts of dry fractionated palm oil stearin (melting point 50° C.), which palm oil stearin before mixing contained 6% of solid fat. The product obtained after mixing, having a temperature of 13° C. and a solids content of 8%, was filled into tubs. Thus a margarine of good quality was obtained.

In a comparative test the fat components metioned above were combined into one fraction, thus comprising soybean oil (11 parts), hardened soybean oil (3 parts), butter olein (30 parts) and palm oil stearin (20 parts), which fraction was processed together with the waterphase through an AAC sequence. The complete fatblend used in the comparative test had the following N-values: N10=32, N20=16, N30=8, N35=4.

Figure 6:
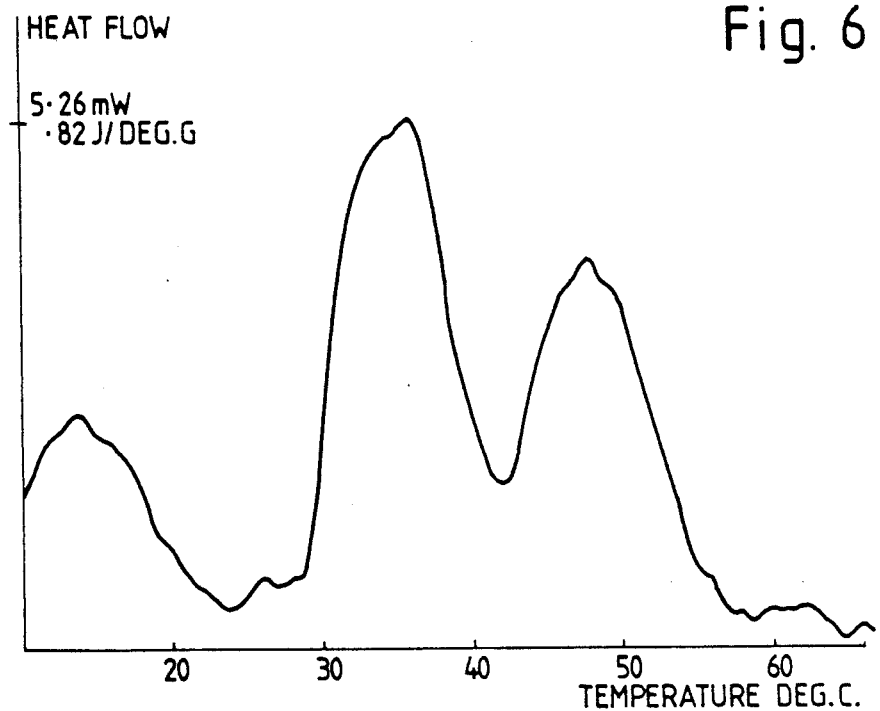
Figure 7:
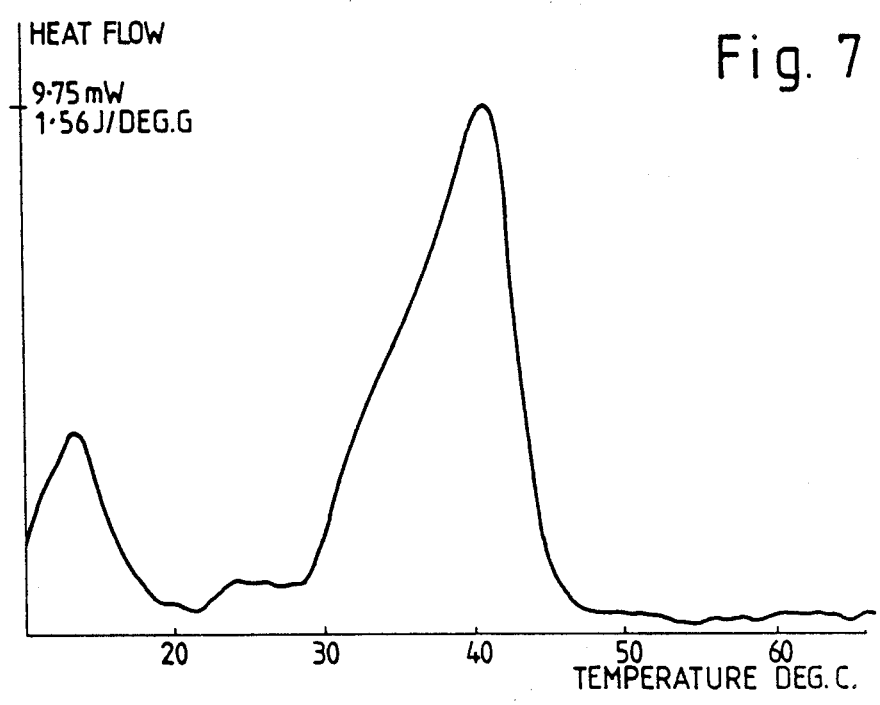

The DSC-curves of the above two products are represented in FIGS. 6 and 7.

Figure 8:
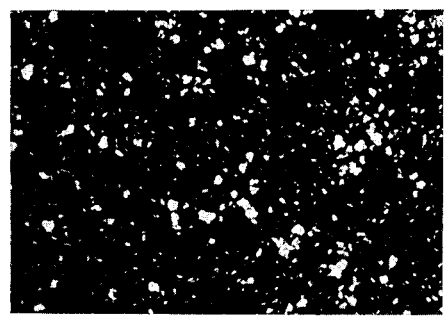
Figure 9:
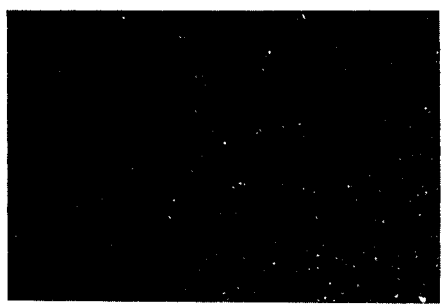

By means of a light microscope also fotographic pictures were taken from the above two products. These pictures are represented in FIGS. 8 and 9. In the pictures the white particles represent the fat-crystals. In both pictures 1 mm corresponds with about 10 microns in the products. The microscopic pictures were taken of a product which had previously been cooled to 5° C.

Moreover also a set of other properties of the product were determined, and represented in Table 4.

TABLE 4

| Example | 5 | E |
|---|---|---|
| $C_5$ | 1270 | 1300 |
| $C_{15}$ | 255 | 235 |
| Oil exudation | ++ | ++ |
| (24 hrs at 30° C.) | | |
| Salt impression | | |
| (panel) | 40% | 29% |
| cycled | 37% | 25% |

EXAMPLES 6 AND COMPARATIVE EXAMPLE F

A margarine was prepared using the following fat blend: 16 parts of soybean oil, 59 parts of slightly hardened soybean oil (melting point 28° C.), and 25 parts of dry-fractionated palm oil stearin (melting point 50° C.). The combined fat blend appeared to have the following N-values: $N_{10}=33$, $N_{20}=19$, $N_{30}=6$, and $N_{35}=2$.

In a first experiment (example 6), the fat fraction consisting of soybean oil and slightly hydrogenated soybean oil is processed together with the waterphase through an AAC-sequence, and subsequently mixed with the palm oil stearin (containing 12% of solid fat), by means of a cavity transfer mixer, rotating at a speed of 500 rpm.

In a comparative test, the complete fat blend, consisting of 16 parts soybean oil, 59 parts hydrogenated soybean oil, and 25 parts palm oil stearin, is mixed with the waterphase, using an AAC-sequence.

Figure 10:
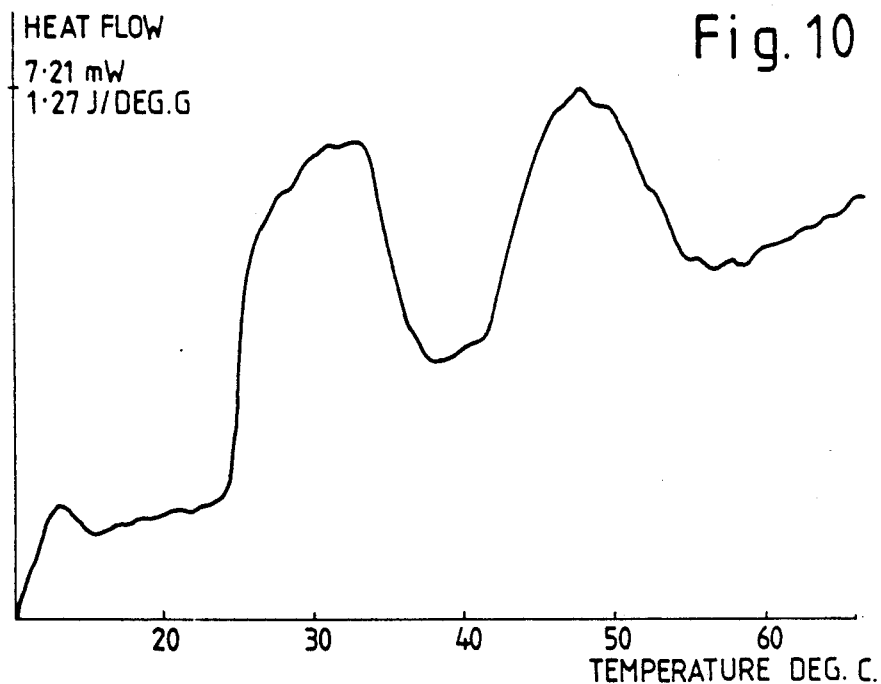
Figure 11:
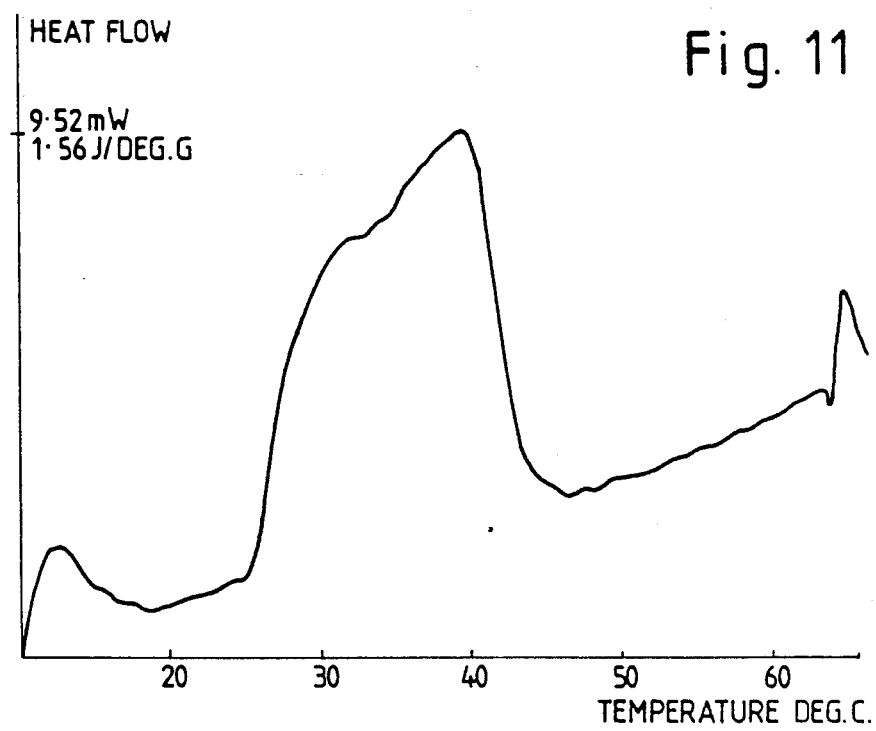

The DSC-curves for the above two products are represented in FIGS. 10 and 11. Despite the drifting base-line, the DSC-peaks are clearly distinguishable.

Figure 12:
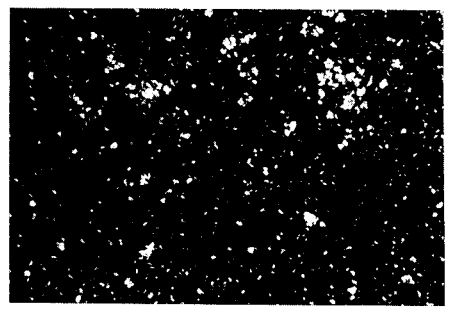
Figure 13:

The microscopical images of the two product were fotographed; the pictures thus obtained are represented in FIGS. 12 and 13. These pictures clearly indicate the difference in crystal-structure between the products according to the present invention, and conventional products.

Futhermore also other properties of the two margarine products were determined. The results are represented in Table 5.

TABLE 5

| Example | 7 | F |
|---|---|---|
| $C_5$ | 1400 | 1015 |
| $C_{25}$ | 70 | 125 |
| Salt release (fresh) 35° C. | 72% | 47% |
| Salt release (cycl.) 35° C. | 58% | 45% |
| Oil Exudation | ++ | ++ |

TABLE 5-continued

| Example | 7 | F |
|---|---|---|
| (24 hrs at 30° C.) | | |

We claim:

1. Process for preparing an edible fat product comprising the steps of:
   (a) emulsifying at least one first fat with a water phase to obtain an emulsion;
   (b) adjusting said emulsion to a temperature below 15° C. thereby obtaining a cold water-in-oil emulsion containing at least 1 weight % of crystallized fat; and
   (c) mixing said cold water-in-oil emulsion with at least one of a second fat having a slip melting point above that of said first fat, said second fat being maintained at a temperature at which said second fat has a N-value of not more than 25.

2. Process according to claim 1 wherein the cold water-in-oil emulsion and the second fat are mixed for a short 3. Process according to claim 1, wherein the slip melting point of the first fat is below 35° C.

4. Process according to claim 1 wherein the slip melting point of the first fat is at least 5° C. lower than the slip melting point of the second fat.

5. Process according to claim 4, wherein the slip melting point of said first fat is different from the slip melting point of said second fat by at least 10° C.

6. Process according to claim 1 wherein the slip melting point of the first fat is below 30° C.

7. Process according to claim 1, wherein the slip melting point of the second fat is above 45° C.

8. Process according to claim 1 wherein the emulsion of step (a) is cooled to a temperature below 10° C.

9. Process according to claim 1, wherein the second fat has a temperature above 20° C. when said second fat is mixed with the emulsion.

10. Process according to claim 1, wherein the second fat, before mixing, has an N-value of between 0 and 10.

11. Process according to claim 1, wherein the cold water-in-oil emulsion and the second fat are mixed using a mixer that exerts low shear on the product.

* * * * *